(12) United States Patent
Caponetti et al.

(10) Patent No.: US 10,982,651 B2
(45) Date of Patent: Apr. 20, 2021

(54) DAMPING OF A WIND TURBINE TOWER OSCILLATION

(71) Applicant: VESTAS WIND SYSTEMS A/S, Aarhus N (DK)

(72) Inventors: Fabio Caponetti, Åbyhøj (DK); Jesper Sandberg Thomsen, Hadsten (DK); Jacob Deleuran Grunnet, Tranbjerg J (DK); Poul Brandt Christensen, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 335 days.

(21) Appl. No.: 16/079,772

(22) PCT Filed: Feb. 24, 2017

(86) PCT No.: PCT/DK2017/050045
§ 371 (c)(1),
(2) Date: Aug. 24, 2018

(87) PCT Pub. No.: WO2017/144061
PCT Pub. Date: Aug. 31, 2017

(65) Prior Publication Data
US 2019/0055923 A1 Feb. 21, 2019

(30) Foreign Application Priority Data

Feb. 24, 2016 (DK) .............................. PA201670095

(51) Int. Cl.
*F03D 7/02* (2006.01)
*F03D 80/00* (2016.01)
(Continued)

(52) U.S. Cl.
CPC ............. *F03D 7/0224* (2013.01); *F03D 1/00* (2013.01); *F03D 7/024* (2013.01); *F03D 7/0296* (2013.01);
(Continued)

(58) Field of Classification Search
None
See application file for complete search history.

(56) References Cited

U.S. PATENT DOCUMENTS

| 4,435,647 A * | 3/1984 | Harner ................... F03D 7/043 |
|  |  | 290/44 |
| 2010/0111693 A1* | 5/2010 | Wilson .................. F03D 7/0296 |
|  |  | 416/1 |

(Continued)

FOREIGN PATENT DOCUMENTS

| CN | 101903647 A | 12/2010 |
| CN | 102486158 A | 6/2012 |

(Continued)

OTHER PUBLICATIONS

Chinese Office Action for Application No. 2017800251942 dated Jul. 15, 2019.

(Continued)

*Primary Examiner* — David Hamaoui
*Assistant Examiner* — Jason Fountain
(74) *Attorney, Agent, or Firm* — Patterson + Sheridan, LLP (57) ABSTRACT

A method for damping an oscillation of a tower of a wind turbine is disclosed, wherein a pitch angle of each of the one or more rotor blades is individually adjustable, the method comprising damping the oscillation of the tower by pitching each rotor blade individually according to tower damping pitch control signals, wherein each tower damping pitch control signal comprises a first periodic component, where (Continued)

a first frequency of the first periodic component corresponds to a frequency difference between a tower frequency of the oscillation of the tower and a rotor frequency of a rotation of the rotor, and where a second periodic component has been reduced or removed. A second frequency of the second periodic component corresponds to a frequency sum of the tower frequency and the rotor frequency.

14 Claims, 7 Drawing Sheets

(51) Int. Cl.
    *F03D 1/00*    (2006.01)
    *F03D 7/04*    (2006.01)
    *F03D 80/80*    (2016.01)

(52) U.S. Cl.
    CPC ............ *F03D 7/042* (2013.01); *F03D 80/80* (2016.05); *F05B 2200/20* (2013.01); *F05B 2220/30* (2013.01); *F05B 2240/221* (2013.01); *F05B 2260/74* (2013.01); *F05B 2260/80* (2013.01); *F05B 2260/96* (2013.01); *F05B 2260/964* (2013.01); *F05B 2270/10* (2013.01); *F05B 2270/326* (2013.01); *F05B 2270/334* (2013.01); *F05B 2270/402* (2013.01); *F05B 2270/604* (2013.01); *Y02E 10/72* (2013.01)

(56) References Cited

U.S. PATENT DOCUMENTS

| | | |
|---|---|---|
| 2010/0289266 A1 | 11/2010 | Wortmann et al. |
| 2012/0299305 A1 | 11/2012 | Brogan et al. |
| 2015/0003984 A1 | 1/2015 | Pineda Amo |

FOREIGN PATENT DOCUMENTS

| | | |
|---|---|---|
| CN | 103249946 A | 8/2013 |
| CN | 103649528 A | 3/2014 |
| DE | 102010053523 B4 | 9/2015 |
| EP | 2620639 A1 | 7/2013 |
| EP | 2896828 A1 | 7/2015 |
| WO | 2008081232 A1 | 7/2008 |
| WO | 2015/086024 A1 | 6/2015 |
| WO | 2016150442 A1 | 9/2016 |
| WO | 2017144061 A1 | 8/2017 |

OTHER PUBLICATIONS

PCT International Search Report for Application No. PCT/DK2017/050045 dated Sep. 6, 2017.
Danish Patent and Trademark Office First Technical Examination for Application No. PA201670095 dated Jul. 28, 2016.
PCT Written Opipion of the International Searching Authority for Application PCT/DK2017/050045.
India Patent Office, First Examination Report for Application: 201817033009, dated Aug. 28, 2020.

\* cited by examiner

DAMPING OF A WIND TURBINE TOWER OSCILLATION

FIELD OF THE INVENTION

The present invention relates to a method for damping an oscillation of a tower of a wind turbine, more particularly a method for damping an oscillation of a tower of a wind turbine by pitching each rotor blade individually and a corresponding computer program product, control system and wind turbine.

BACKGROUND OF THE INVENTION

A wind turbine as known in the art comprises a wind turbine tower and a rotor. The rotor comprises a number of rotor blades. The tower is prone to oscillations, which may be due to cyclic rotor forces and to inhomogeneities in a wind field or external forces acting, e.g., sea waves.

Blade pitch adjustments may be used to counteract or damp a lateral oscillation of the tower. These pitch adjustments requires energy and cause wear and tear of the wind turbine, such as the blade bearings of each rotor blade. Hence, an improved method for damping an oscillation of a tower of a wind turbine would be advantageous, and in particular a method for damping an oscillation of a tower of a wind turbine requiring less activity of the pitch system and/or enabling reducing wear and tear.

SUMMARY OF THE INVENTION

It may be seen as an object of the present invention to provide a method for damping an oscillation of a tower of a wind turbine that solves or mitigates the above mentioned problems with wear and tear of the pitch system.

The above described object is intended to be obtained in a first aspect of the invention by providing a method for damping an oscillation of a tower of a wind turbine, where the wind turbine comprises the tower and a rotor with one or more rotor blades, the rotor being connected to the tower and being adapted to drive a generator, wherein a pitch angle of each of the one or more rotor blades is individually adjustable, the method comprising:
  Preparing for each rotor blade a precursor signal, where each precursor signal comprises:
    A first periodic component with a first amplitude which is larger than zero, and where the first frequency of the first periodic component corresponds to the frequency difference between the tower frequency and the rotor frequency,
    and
    a second periodic component with a second amplitude which is larger than zero, and where a second frequency of the second periodic component corresponds to a frequency sum of the tower frequency and the rotor frequency,
  Preparing for each rotor blade a tower damping pitch control signal as a result of the precursor signal wherein the second amplitude of the second periodic component has been partially or fully reduced relative to the first amplitude of the first periodic component,
  Damping the oscillation of the tower by pitching each rotor blade individually according to the tower damping pitch control signals.

The invention is particularly, but not exclusively, advantageous for obtaining a method for damping an oscillation of a tower of a wind turbine, which may enable reducing the required pitching activity. By having the second amplitude being smaller than the first amplitude, or where the second amplitude is even removed, decreases the required pitching activity, since less, or no, pitching activity is required to pitch at the second frequency. Furthermore, the wear and tear involved with pitching at the second frequency may be reduced due to the smaller second amplitude.

By 'damping the oscillation' may be understood exerting a damping force, such as a force, which is directed opposite a direction of movement of the tower and with a magnitude being proportional to the speed of said movement.

By 'oscillation of a tower of a wind turbine' may be understood a lateral movement, such as a horizontal movement in the rotor plane.

By 'damping the oscillation of the tower by pitching each rotor blade individually' may be understood pitching the blades individually so that the resultant drag and aerodynamic forces act to dampen the oscillation of the tower.

By 'tower damping pitch control signals' may be understood pitch control signals, such as an individual tower damping pitch control signal for each blade, used to control pitch actuators, such as sent from a control system, such as a pitch control system, to a pitch force system, which adjusts a pitch of each blade correspondingly.

When reference is made to 'a first frequency corresponds to a frequency difference' or 'a second frequency corresponds to a frequency sum' it may be understood that the first frequency or the second frequency in practical circumstances corresponds to the frequency difference or the frequency sum, respectively, such as the first frequency or the second frequency being within +/−50%, such as within +/−25%, such as within +/−10%, such as within +/−5%, such as within +/−2%, such as within +/−1% of the frequency difference or the frequency sum, respectively, such as corresponds substantially to the frequency difference or the frequency sum, respectively, such as corresponds exactly to the frequency difference or the frequency sum, respectively.

The tower frequency is to be understood as the frequency of the tower vibration, in particular the most dominant frequency component of the tower vibration. The tower frequency may e.g. be the tower's first natural frequency, but it can also be a different frequency e.g. the rotor frequency.

In a second aspect, the invention relates to a computer program product having instructions which, when executed cause a computing device or a computing system or a control system for a wind turbine to perform a method according to the first aspect.

In a third aspect, the invention relates to a control system arranged for damping an oscillation of a tower of a wind turbine and being arranged for carrying out the method according to the first aspect. The control system may be arranged to determine a pitch signal and may be implemented in a general controller for a wind turbine or a control element, such as a dedicated pitch controller.

In a fourth aspect, the invention relates to a wind turbine comprising a control system according to the third aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
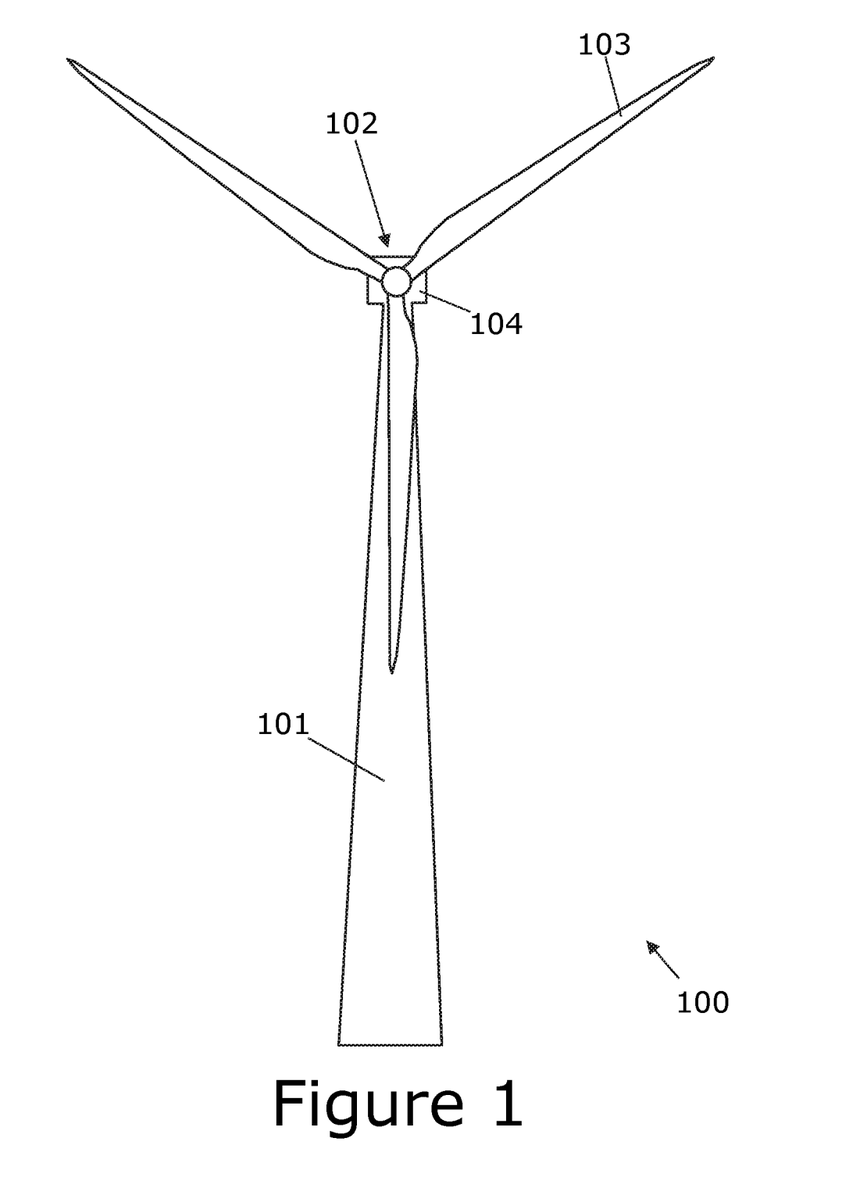
FIG. 1 depicts a wind turbine.

FIG. 1 shows a wind turbine 100 (which may also be referred to as a wind turbine generator (WTG)) comprising a tower 101 and a rotor 102 with at least one rotor blade 103, such as three rotor blades. The rotor is connected to a nacelle 104, which is mounted on top of the tower 101 and being adapted to drive a generator situated inside the nacelle. The rotor 102 is rotatable by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request. The rotor blades 103 can be pitched in order to alter the aerodynamic properties of the blades, e.g., in order to maximize uptake of the wind energy and to ensure that the rotor blades are not subjected to too large loads when strong winds are blowing and to exert damping forces on the tower. The wind turbine 100 comprises a control system arranged for damping an oscillation of a tower of a wind turbine, the control system being arranged to determine a pitch signal and may be implemented in either a general controller for the wind turbine or a control element, such as a dedicated pitch system, e.g., where the blades are pitched by a pitch system with a pitch force system controlled by a pitch control system, where the pitch force system includes actuators, such as hydraulic actuators, for collectively and/or individually pitching the blades dependent on a pitch signal from the pitch control system, such as the pitch signal comprising the tower damping pitch control signal comprises.

Figure 2:
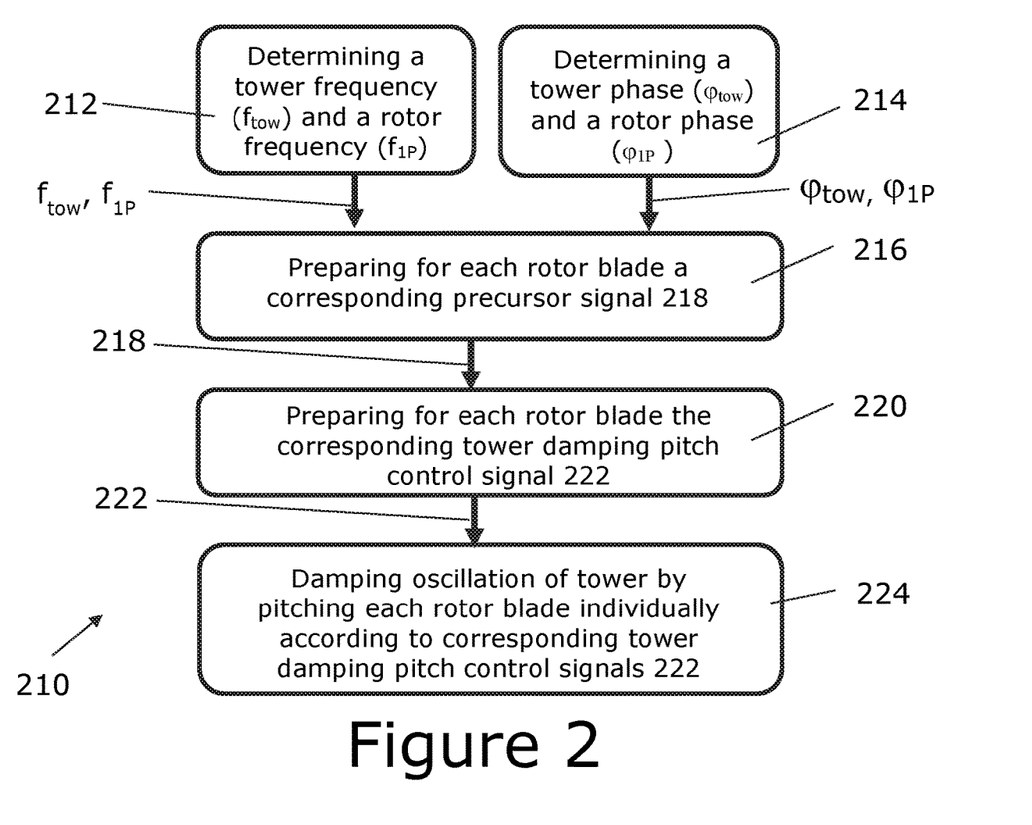
FIG. 2 shows a method for damping an oscillation of a tower of a wind turbine.

FIG. 2 shows a method 210 for damping an oscillation of a tower of a wind turbine, where the wind turbine comprises the tower and a rotor with one or more rotor blades, the rotor being connected to the tower and being adapted to drive a generator, wherein a pitch angle of each of the one or more rotor blades is individually adjustable, the method comprising:

Damping 224 the oscillation of the tower by pitching each rotor blade individually according to corresponding tower damping pitch control signals 222, wherein each tower damping pitch control signal comprises:

A first periodic component with a first amplitude being larger than zero, where a first frequency of the first periodic component corresponds to a frequency difference between a tower frequency ($f_{tow}$) of the oscillation of the tower and a rotor frequency ($f_{1P}$) of a rotation of the rotor, and a second periodic component with a second amplitude being smaller than the first amplitude, where a second frequency of the second periodic component corresponds to a frequency sum of the tower frequency ($f_{tow}$) and the rotor frequency ($f_{1P}$).

The tower damping pitch control signal is based on a precursor signal, and in the present embodiment the method further comprises:

Preparing 216 for each rotor blade a corresponding precursor signal 218, where each corresponding precursor signal comprises:

The first periodic component with the first amplitude which is larger than zero, and where the first frequency of the first periodic component corresponds to the frequency difference between the tower frequency ($f_{tow}$) and the rotor frequency ($f_{1P}$), and the second periodic component with the second amplitude which is larger than zero, such as the first amplitude being equal to the second amplitude, and where the second frequency of the second periodic component corresponds to a frequency sum of the tower frequency ($f_{tow}$) and the rotor frequency ($f_{1P}$), Determining 220 for each rotor blade the corresponding tower damping pitch control signal 222 as a result of the corresponding precursor signal 218 wherein the second amplitude of the second periodic component has been partially or fully reduced relative to the first amplitude of the first periodic component.

Thus, it may be understood that the tower damping pitch control signals may be prepared by first preparing precursor signals, optionally comprising periodic components of equal size at frequencies corresponding to both sum and difference of the tower and 1P rotor frequencies, and then subsequently preparing the tower damping pitch control signals by reducing the amplitude of the second periodic component at the sum frequency, e.g., with a filter, such as a bandpass filter or a notch filter.

The precursor signal should be understood broadly and need not be a physical signal, but may be a mathematical representation of the frequency positions of the first and second periodic components.

In general, a strategy for lateral damping (LD), may be to emulate a viscous damper by continuously creating a force which opposes the crosswind tower motion. The lateral tower behaviour can be modelled as a simple linear spring-mass-damper system.

A lateral displacement x as a function of the time t is governed by the differential equation:

$$m\ddot{x}(t) + c\dot{x}(t) + kx(t) = F(t)$$

Here m is the mass, c the damping coefficient and k is spring constant. An objective may then be to generate a force F(t) proportional to the velocity $\dot{x}(t)$. This may be achieved by:

1. Determining, such as measuring, the lateral tower top acceleration, $\ddot{x}(t)$
2. Estimating the lateral tower velocity, $\ddot{x}(t) \rightarrow \dot{x}(t)$ 3. Generating a force proportional to the estimated velocity, $F(t) = -K_p \overline{\dot{x}(t)}$ Methods of the present invention may generate a lateral (sideways) force by cyclically varying the pitch angle of each blade as function of its position in the rotor plane. The pitch signal for three exemplary blades A, B, C can be written as Eq. 5.

$$\begin{cases} \vartheta_A(t) = \vartheta_0(t) + \vartheta_{LD}(t)\cos(\varphi(t)) \\ \vartheta_B(t) = \vartheta_0(t) + \vartheta_{LD}(t)\cos\left(\varphi(t) - \frac{2}{3}\pi\right) \\ \vartheta_C(t) = \vartheta_0(t) + \vartheta_{LD}(t)\cos\left(\varphi(t) - \frac{4}{3}\pi\right) \end{cases} \quad (5)$$

Here $\vartheta_0(t)$ is the collective pitch angle and $\varphi(t)$ the rotor position. To generate a force useful for tower damping $\vartheta_{LD}(t)$ has to be proportional to the estimated tower velocity, $$\vartheta_{LD}(t) = -K_p \overline{\dot{x}(t)} \quad (6)$$

This may be a control action periodic with the frequency of the oscillation of the tower $f_{tow}$, thus Eq. 7 is substituted into Eq. 5 leading to an individual pitch signal with frequency $f_{1P} \pm f_{tow}$.

$$\vartheta_{LD}(t) = \vartheta(t)\cos(2\pi f_{tow} t) \quad (7)$$

Here $\vartheta(t)$ is a generic amplitude, which may be proportional with the amplitude of the tower velocity. The aerodynamic forces acting on a generic blade i are given by sum of the lift $F_{L,i}$ and drag $F_{D,i}$ generated at each blade section relative to the inflow direction.

Those forces are transformed in the rotor coordinate system, i.e., the forces, local to the blade are expressed in a coordinate system, which is on the rotor plane.

$$F_{x,i}(t) = F_{L,i}(t)\sin(\varphi(t)) - F_{D,i}(t)\cos(\varphi(t)) \quad (8)$$

$$F_{y,i}(t) = F_{L,i}(t)\cos(\varphi(t)) + F_{D,i}(t)\sin(\varphi(t)) \quad (9)$$

Here $F_{x,i}$ and $F_{y,i}$ are the resulting forces from the i'th-blade, expressed in a orthogonal coordinate system with origin the rotor centre. Eq. 8 and Eq. 9 represent, respectively, the sideways and thrustwise components of the forces generated. When pitching the blades individually, the sideways force on the individual blade is function of the pitch angle, which can be linearized around the operating point $\vartheta_0$:

$$F_{x,i}(t) = F_{x,0}(t) + \frac{\partial F_x}{\partial \vartheta}(\vartheta_{LD}(t) - \vartheta_0(t)) \quad (10)$$

Considering the gravitational forces adding to zero, the total aerodynamic sideways force acting on the tower top is the geometric addition of the individual forces at the blades flange, Eq. 11 gives the total lateral force $F_x$ acting on the rotor centre generated by the blades A, B and C:

$$F_x(t) = F_{x,A}(t)\cos(\varphi) + F_{x,B}(t)\cos\left(\varphi - \frac{2}{3}\pi\right) + F_{x,C}(t)\cos\left(\varphi - \frac{4}{3}\pi\right) \quad (11)$$

Consider as example blade A, the individual pitch signal (i.e., ignoring any collective pitch signal) resulting from lateral damping (LD) can be expressed as function of the continuous time t as in Eq. 12.

$$\vartheta_A = (t) = A \cos(2\pi f_{tow} t + \varphi_{tow})\cos(2\pi f_{1P} t + \varphi_{1P}) \quad (12)$$

Where A is the generic pitch amplitude, $f_{tow}$ the tower frequency in Hz, $\varphi_{tow}$ a generic phase shift at the tower frequency, $f_{1P}$ the 1P frequency and $\varphi_{1P}$ is a generic phase shift at the 1P frequency.

Eq. 12 is rewritten in Eq. 13 to elicit the presence of the two harmonics at $f_{tow} \pm f_{1P}$:

$$\vartheta_A(t) = \frac{A}{2}\cos(2\pi(f_{tow} - f_{1P})t + \varphi_{tow} - \varphi_{1P}) + \frac{A}{2}\cos(2\pi(f_{tow} + f_{1P})t + \varphi_{tow} + \varphi_{1P}) \quad (13)$$

Figure 9:
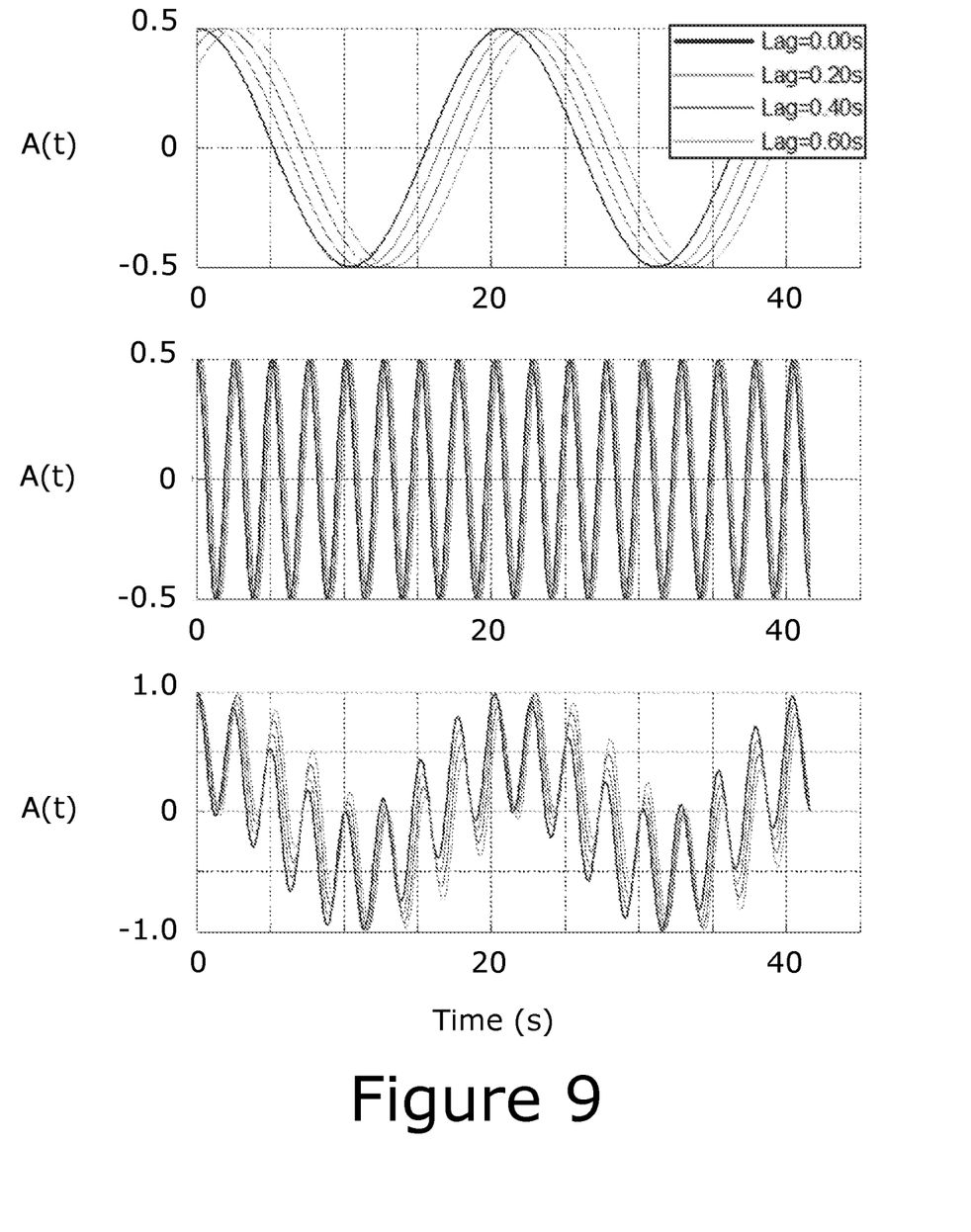
FIG. 9 shows results of phase adjustment.

Following, it is clear that a time delay will have a different effect on the two harmonics, because of the different frequencies and the different combination of the actuation and control phases. FIG. 9 shows a numerical example of the Eq. 13, depicting the effects of time delays on the resulting signal considering $\varphi_{1P}$ and $\varphi_{tow}$ equal to zero.

Figure 3:
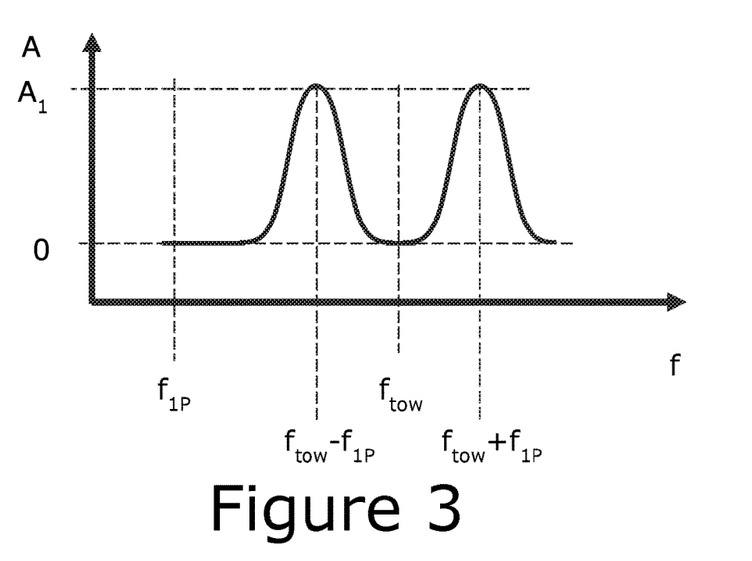
FIG. 3 shows an example of a frequency spectrum of a precursor signal.

FIG. 3 shows an example of a frequency (f) spectrum (i.e., amplitude A as a function of frequency f) of a precursor signal with a first periodic component with a first amplitude $A_1$ which is larger than zero, and where the first frequency of the first periodic component corresponds to the frequency difference between the tower frequency ($f_{tow}$) and the rotor frequency ($f_{1P}$), and a second periodic component with a second amplitude $A_1$ which is larger than zero and in this embodiment equal to the first amplitude, and where a second frequency of the second periodic component corresponds to a frequency sum of the tower frequency ($f_{tow}$) and the rotor frequency ($f_{1P}$).

Figure 4:
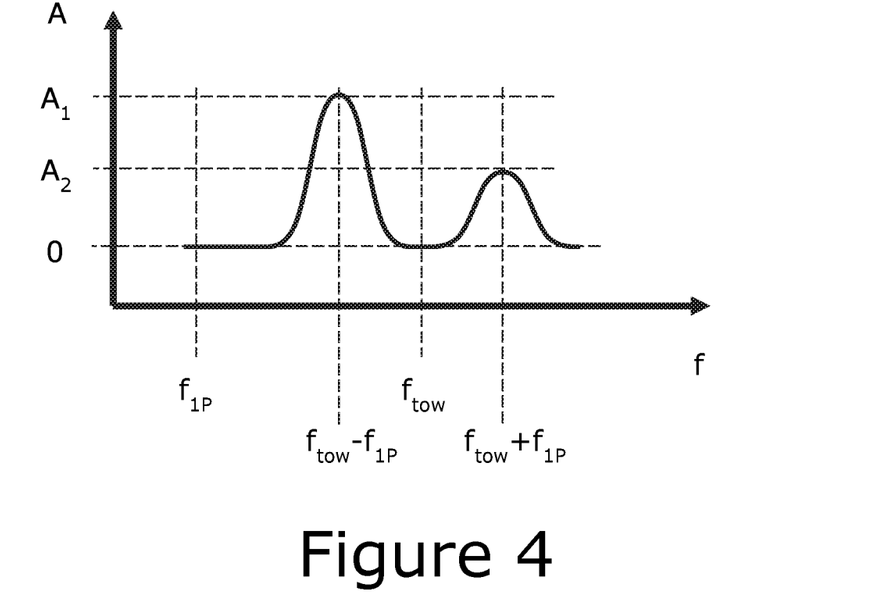
FIGS. 4-5 show examples of frequency spectra of a tower damping pitch control signals.
Figure 5:
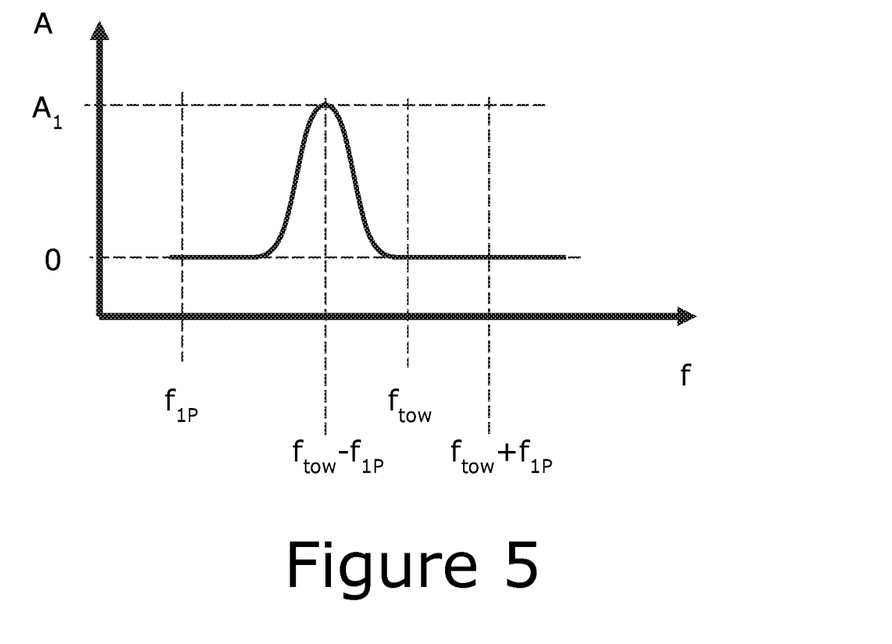

There is also presented embodiments wherein the second amplitude is zero or wherein the second amplitude is non-zero, such as illustrated in FIGS. 4-5. In embodiments each tower damping pitch control signal consists of the first periodic component and the second periodic component.

FIG. 4 shows an example of a frequency (f) spectrum of a tower damping pitch control signal, which comprises a first periodic component with a first amplitude $A_1$ being larger than zero, where a first frequency of the first periodic component corresponds to a frequency difference between a tower frequency ($f_{tow}$) of the oscillation of the tower and a rotor frequency ($f_{1P}$) of a rotation of the rotor, and a second periodic component with a second amplitude $A_2$ being non-zero and smaller than the first amplitude $A_1$, where a second frequency of the second periodic component corresponds to a frequency sum of the tower frequency ($f_{tow}$) and the rotor frequency ($f_{1P}$).

In an embodiment, each tower damping pitch control signal substantially exclusively comprises the first periodic component, such as exclusively comprises the first periodic component. An advantage of having exclusively the first periodic component may be that reduces the required energy with an amount corresponding to the energy required for pitching at the second frequency. Another advantage may be that it enables phase shifting, since only a single periodic component is then present.

FIG. 5 shows a corresponding example of a frequency (f) spectrum of a tower damping pitch control signal, which is similar to FIG. 4 except the second periodic component has a second amplitude being zero.

In an embodiment, a first phase of the first periodic component in each tower damping pitch control signal is calculated based on a phase difference between the tower phase ($\varphi_{tow}$) and the rotor phase ($\varphi_{1P}$) and a second phase of the second periodic component in each tower damping pitch control signal is optionally calculated based on a sum of the tower phase ($\varphi_{tow}$) and the rotor phase ($\varphi_{1P}$).

In an embodiment a first phase of the first periodic component in each tower damping pitch control signal is calculated based on a sum of:
- a phase difference between a tower phase ($\varphi_{tow}$) of the oscillation of the tower and a rotor phase ($\varphi_{1P}$) of the rotation of the rotor, and
- a phase adjustment with respect to said phase difference A second phase of the second periodic component in each tower damping pitch control signal is optionally calculated based on a sum of:
- a phase sum of the tower phase ($\varphi_{tow}$) and the rotor phase ($\varphi_{1P}$), and
- the phase adjustment with respect to said phase sum.

An advantage of this may be that it enables providing a first phase being appropriate for damping the tower oscillation, and furthermore optionally that it enables providing a second phase being appropriate for damping the tower oscillation.

An advantage of introducing a phase adjustment may be, that said phase adjustment may compensate for time delays and/or phase shifts. Time delays may for example be introduced in the process of detection of a tower oscillation, generation of corresponding tower damping pitch control signals and pitching according to these tower damping pitch control signals. Phase shifts may be introduced by filters, such as low-pass filters used for processing signals from sensors for monitoring tower oscillations. If a phase adjustment is not introduced, then timing of pitching may be sub-optimal due to time delays and phase adjustments. However, by introduction of a phase adjustment, then parameters associated with time delays and phase shifts can be chosen freely and optimally, since the combined effect of time delays and phase shift can be taken into account via the phase adjustment.

In an embodiment a first phase of the first periodic component in each tower damping pitch control signal corresponds to, such as is based on and corresponds to, such as in practical circumstances corresponds to, such as is equal to, a sum of:
- a phase difference between the tower phase ($\varphi_{tow}$) and the rotor phase ($\varphi_{1P}$), and
- a phase adjustment with respect to said phase difference.

A second phase of the second periodic component in each tower damping pitch control signal optionally corresponds to, such as is based on and corresponds to, such as in practical circumstances corresponds to, such as is equal to, a sum of:
- a phase sum of the tower phase ($\varphi_{tow}$) and the rotor phase ($\varphi_{1P}$), and
- the phase adjustment with respect to said phase sum.

In an embodiment, the phase adjustment is dependent on, such as corresponds to, such as in practical circumstances corresponds, the effect, such as the combined effect, of:
- A time delay, such as a time delay from detection of oscillation of the tower to a damping actuation, and/or
- A phase shift, such as a phase shift introduced by a filter, such as a low-pass filter.

It may be understood that in terms of periodic actuation, the effect of a time delay and a phase shift are equivalent and can be added together (taking their sign into account).

By making the phase adjustment dependent on, such as equivalent to the combined effect of, the time delay and/or phase shift, the time shift and phase shift may be taken into account and their negative effects mitigated or eliminated.

In an embodiment, the phase adjustment is made dependent on an operational point of the wind turbine, a structural characteristics of the wind turbine and/or the tower frequency of the wind turbine. In such an embodiment, the amount and possibly also the sign of the adjustment may be made in dependency upon one or more of the following: the speed of the rotor, the 1P frequency, the ratio of the 1P frequency and the tower's first natural frequency. The phase adjustment may also be dependent on such structural characteristics as the damping of the tower oscillation in the given operational point.

Figure 6:
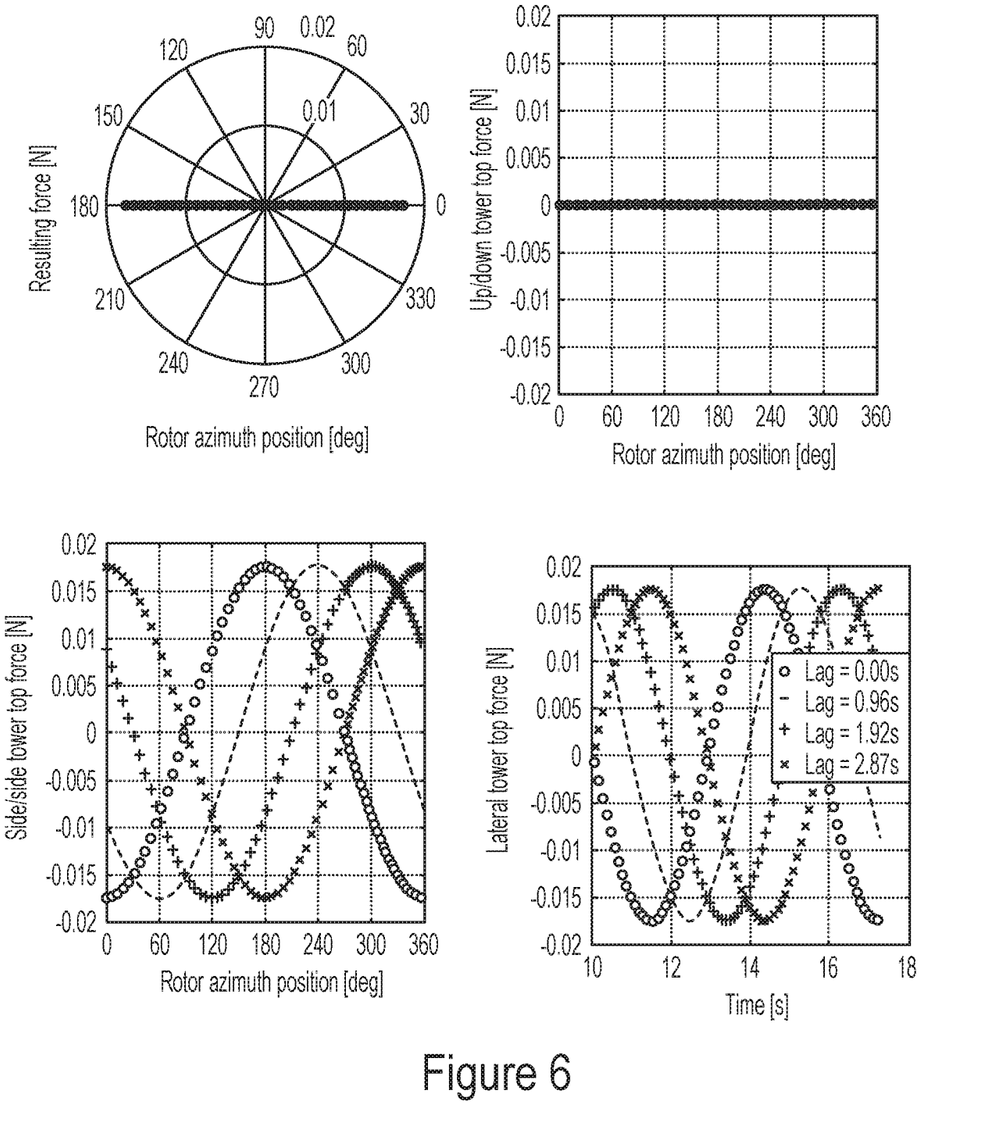
FIG. 6 shows results of pitching according to a signal corresponding to the precursor signal in FIG. 3.

FIG. 6 shows example results of pitching according to a signal corresponding to the precursor signal in FIG. 3.

The upper left figure shows a polar plot of the direction of a force applied on the tower from the blades due to pitching according to the signal corresponding to the precursor signal. The angles 90° and 270° corresponds to up and down, respectively, and the angles 0° and 180° corresponds to the two directions away from the wind turbine in the horizontal plane orthogonal to the rotor axis.

The upper right figure indicates the up/down tower top force, i.e., the force in the vertical direction orthogonal to the rotor axis applied on the tower from the blades due to pitching according to the signal corresponding to the precursor signal as a function of a request—a lateral damping (LD) modulation signal—sent from a control system.

The lower left figure shows the lateral tower top force as a function of rotor azimuth position.

The lower right figure shows the lateral tower top force as a function of time.

More particularly, the polar plot in the upper left corner shows that a force applied on the tower from the blades due to pitching according to the signal corresponding to the precursor signal does is horizontal. However, as can be seen in the remaining three figures, a lag (caused by time delay and/or phase shift) will start reducing the damping effect or even enhance it. For example, for a certain lag, which in the present example is 2.87 seconds, the force applied on the tower from the blades due to said pitching works exactly opposite the direction, which corresponds to viscous damping.

In order to take the lag into account, a phase adjustment may be introduced.

Figure 7:
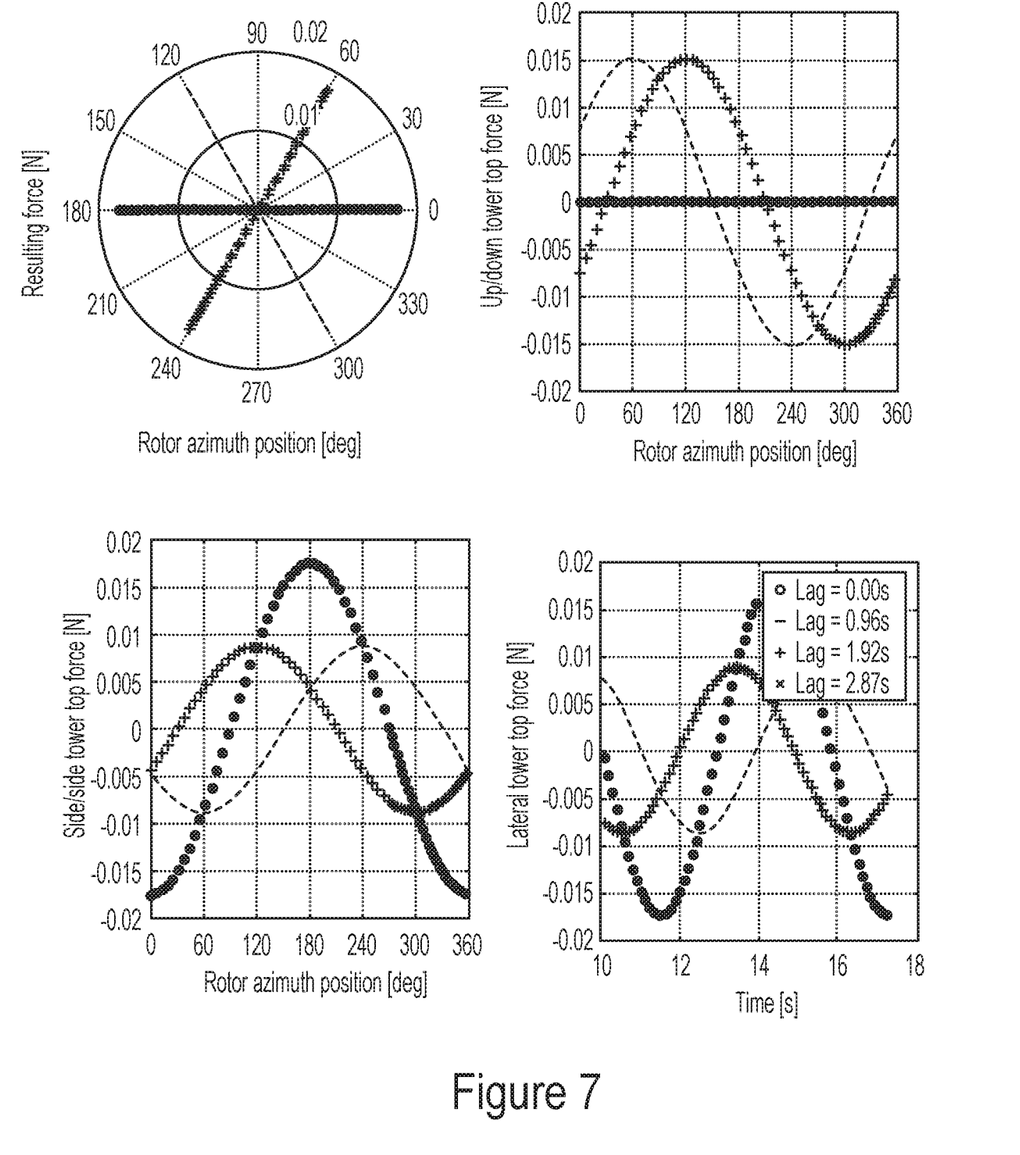
FIG. 7 shows results of pitching where a phase adjustment has been introduced to take the lag into account.

FIG. 7 shows a situation corresponding to FIG. 6, but where a phase adjustment has been introduced to take the lag into account. However, the phase adjustment affects the individual components differently, and hence is not effective in eliminating the effects of lag. For example, in the upper left corner, it can be seen that a lag may result in the a force applied on the tower from the blades due to pitching according to the signal corresponding to the precursor signal with a phase adjustment is no longer confined to the horizontal plane, thus applies forces in a vertical direction (as also shown in the upper right figure), and the forces in the horizontal direction are too small (as indicated in the lower left figure). Also, as seen in the two lower figures, the phase is no longer optimal.

It may be noted, that a phase adjustment may nevertheless be advantageous if the amplitude of the second periodic component is zero or relatively small with respect to respect to the amplitude of the first periodic component.

Figure 8:
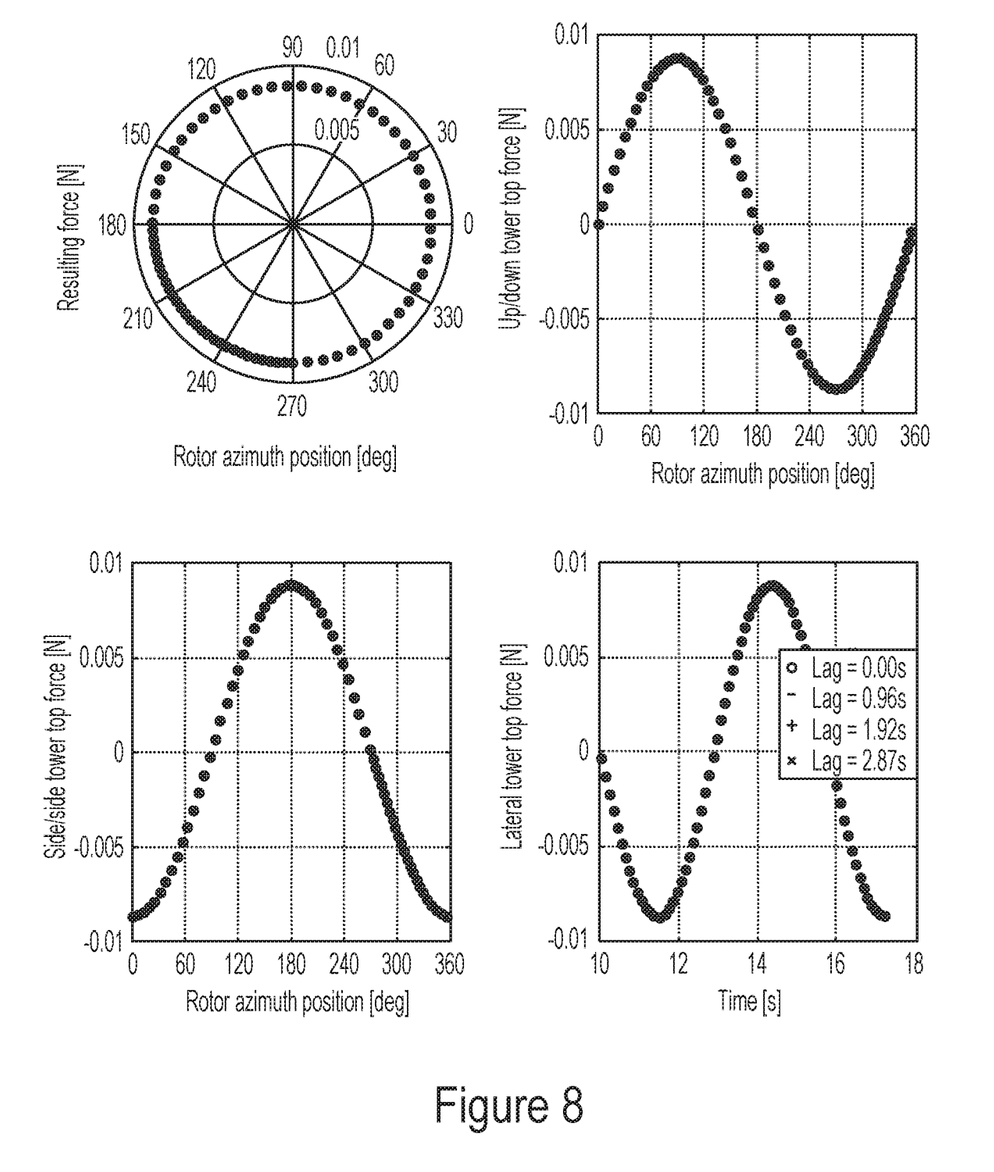
FIG. 8 shows results of pitching according to a tower damping pitch control signal as depicted in FIG. 5.

FIG. 8 comprises graphs with a format similar to FIGS. 6-7 and shows results of pitching according to a tower damping pitch control signal as depicted in FIG. 5 where the second periodic component has a second amplitude being zero. More particularly, the polar plot in the upper left corner shows that a force applied on the tower from the blades due to pitching according to the signal corresponding to the precursor signal does is not only horizontal, but also comprises a vertical component (as also shown in the upper right sub-figure), so that the force vector actually draws a circle (over time). However, the horizontal component—as can be seen in the lower left figure—is working in the right direction. The vertical force component is carried by the tower and/or gravity. As can be seen in the two lower sub-figures, a lag (caused by time delay and/or phase shift) can be compensated with a phase adjustment.

Thus, having only the first periodic component allows finding the rotor (azimuth) phase offset to be used for compensating time delays and/or phase shifts in a control loop.

It may be noted that the lower left sub-figure in FIG. 8 indicates that the horizontal force amplitude (approximately 0.1 N) are only half of the horizontal force amplitude (approximately 0.2 N) which can be read off the lower left sub-figure in FIG. 6. This is because the second periodic component has been selectively removed in the signal in FIG. 8 with respect to the signal in FIG. 6, thus the resulting force becomes smaller. This can be seen from the equations, where the amplitude were halved in Eq. 13 with respect to Eq. 12. This side effect is easily overcome, e.g., by gain scheduling.

FIG. 9 shows the results of phase adjustment. More particularly, FIG. 9 illustrates in three graphs in three rows a numerical example of pitching with constant amplitude. The first two rows depict, respectively, the time dependent signal A(t) of the first periodic component (first row) and the second periodic component (second row) at $f_{tow} \pm f_{1P}$ which when summed give rise to the bottom row. Different lines in each row show the effect of a time delay from 0 seconds to 0.6 seconds on the individual signals. The specific numbers are (referring to Eq. 13), $f_{1P}$=0.174 Hz, $f_{tow}$=0.22 Hz, A=1. The figure shows that phase adjustments are possible when having one or the other periodic component in the signal, but that the presence of both periodic components obscures the resulting signal. In each row the distance between the curves representing different delays increases with the delay.

In an embodiment, the second amplitude depends on an available power, such as a hydraulic pressure in case a force for pitching is provided via a hydraulic pitch force system. An advantage of this may be, that when power is sufficient, a larger second amplitude can be afforded, whereas when less power is available, power is released by having a smaller second amplitude thereby saving the power which should otherwise have been used for pitching at a relatively high frequency. Another possible advantage is that stress on the pumps can be reduced while still damping the side-side tower motion.

In an embodiment, the method 210 further comprises:
Determining 212, such as determining via a sensor, such as a accelerometer:
  A tower frequency ($f_{tow}$) of the oscillation of the tower, and
  a rotor frequency ($f_{1P}$) of a rotation of the rotor.
In an embodiment, the method 210 further comprises:
Determining 214, such as determining via a sensor such as an accelerometer and/or a sensor for giving rotor angular position:
  A tower phase ($\varphi_{tow}$) of the oscillation of the tower, and
  a rotor phase ($\varphi_{1P}$) of a rotation of the rotor.
The oscillation of the tower may in general be, or is, a horizontal oscillation in a plane of the rotor.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for damping an oscillation of a tower of a wind turbine, the method comprising:
  preparing for each rotor blade of the wind turbine a precursor signal, where each precursor signal comprises:
    a first periodic component with a first amplitude which is larger than zero, where a first frequency of the first periodic component corresponds to a frequency difference between a tower frequency and a rotor frequency; and
    a second periodic component with a second amplitude which is larger than zero, where a second frequency of the second periodic component corresponds to a frequency sum of the tower frequency and the rotor frequency;
  preparing for each rotor blade a tower damping pitch control signal as a result of the precursor signal wherein the second amplitude of the second periodic component has been reduced relative to the first amplitude of the first periodic component; and
  damping the oscillation of the tower by pitching each rotor blade individually according to the tower damping pitch control signals.

2. The method according to claim 1, wherein each tower damping pitch control signal exclusively comprises the first periodic component.

3. The method for according to claim 1, where a first phase of the first periodic component in each tower damping pitch control signal is calculated based on a sum of:
  a phase difference between a tower phase of the oscillation of the tower and a rotor phase of the rotation of a rotor of the wind turbine and
  a phase adjustment with respect to said phase difference.

4. The method according to claim 1, where a second phase of the second periodic component in each tower damping pitch control signal corresponds to a sum of:
  a phase sum between a tower phase and a rotor phase; and
  a phase adjustment with respect to said phase sum.

5. The method according to claim 4, wherein the phase adjustment is dependent on:
  a time delay; or
  a phase shift.

6. The method according to claim 4, wherein the phase adjustment is dependent on:
  an operational point of the wind turbine;
  a structural characteristic of the wind turbine; or
  the tower frequency.

7. The method according to claim 1, wherein the second amplitude depends on an available power.

8. The method according to claim 1, the method further comprising determining:
  the tower frequency; and
  the rotor frequency.

9. The method according to claim 1, the method further comprising determining:
  a tower phase of the oscillation of the tower, and
  a rotor phase of a rotation of the rotor.

10. The method according to claim 1, wherein the oscillation of the tower is a horizontal oscillation in a plane of the rotor.

11. The method according to claim 1, wherein each tower damping pitch control signal consists of the first periodic component and the second periodic component.

12. The method according to claim 1 wherein reducing the amplitude of the second periodic component is obtained by use of a bandpass filter or a notch filter.

13. A computer program product having instructions which, when executed cause a computing device or a computing system or a control system for a wind turbine to perform an operation for damping an oscillation of a tower of the wind turbine, wherein the operation further comprises:
   preparing a precursor signal for each rotor blade of the wind turbine, where each precursor signal comprises:
      a first periodic component with a first amplitude which is larger than zero, and where a first frequency of the first periodic component corresponds to a frequency difference between a tower frequency and a rotor frequency, and
      a second periodic component with a second amplitude which is larger than zero, where a second frequency of the second periodic component corresponds to a frequency sum of the tower frequency and the rotor frequency;
   based on the precursor signal, preparing a tower damping pitch control signal for each rotor blade; wherein the second amplitude of the second periodic component has been reduced relative to the first amplitude of the first periodic component; and
   damping the oscillation of the tower by pitching each rotor blade individually according to the tower damping pitch control signals.

14. A wind turbine, comprising:
   a tower;
   a nacelle disposed on the tower;
   a generator disposed in the nacelle;
   a rotor coupled to the generator;
   a plurality of rotor blades coupled to the rotor;
   a control system configured to perform an operation, comprising:
      preparing a precursor signal for each rotor blade, where each precursor signal comprises:
         a first periodic component with a first amplitude which is larger than zero, and where a first frequency of the first periodic component corresponds to a frequency difference between a tower frequency and a rotor frequency; and
         a second periodic component with a second amplitude which is larger than zero, and where a second frequency of the second periodic component corresponds to a frequency sum of the tower frequency and the rotor frequency;
      based on the precursor signal, preparing a tower damping pitch control signal for each rotor blade; wherein the second amplitude of the second periodic component has been at least partially reduced relative to the first amplitude of the first periodic component; and
      damping the oscillation of the tower by pitching each rotor blade individually according to the tower damping pitch control signals.

* * * * *